(12) United States Patent
Kainen

(10) Patent No.: US 10,399,761 B2
(45) Date of Patent: Sep. 3, 2019

(54) CONVENTIONALLY PRICED LIQUID CONTAINER WITH UNIQUE OPTICAL PROPERTIES

(71) Applicant: Dan Kainen, New York, NY (US)

(72) Inventor: Dan Kainen, New York, NY (US)

(73) Assignee: Dan Kainen, New York, NY (US)

( * ) Notice: Subject to any disclaimer, the term of this patent is extended or adjusted under 35 U.S.C. 154(b) by 14 days.

(21) Appl. No.: 15/339,658

(22) Filed: Oct. 31, 2016

(65) Prior Publication Data

US 2018/0118412 A1 May 3, 2018

(51) Int. Cl.
| | |
|---|---|
| *B65D 85/00* | (2006.01) |
| *B65D 81/32* | (2006.01) |
| *G02B 27/22* | (2018.01) |
| *B65D 1/04* | (2006.01) |
| *B65D 1/02* | (2006.01) |
| *B65D 1/44* | (2006.01) |

(52) U.S. Cl.
CPC ....... *B65D 81/3283* (2013.01); *B65D 1/0223* (2013.01); *B65D 1/04* (2013.01); *B65D 1/44* (2013.01); *G02B 27/2214* (2013.01)

(58) Field of Classification Search
CPC ...... B65D 25/54; B65D 1/04; B65D 21/0201; B65D 25/205; B65D 81/3283; B65D 1/0223; B65D 1/44; G02B 3/0031; G02B 3/005; G02B 27/2214
USPC ........ 206/459.5, 303, 504; 215/383; 40/310; 359/619
See application file for complete search history.

(56) References Cited

U.S. PATENT DOCUMENTS

| 1,570,368 A * | 1/1926 | Zeh .................. C03C 17/02 40/310 |
|---|---|---|
| 5,043,130 A | 8/1991 | Fujio |
| 5,494,445 A | 2/1996 | Sekiguchi |
| 5,499,738 A | 3/1996 | Burleigh |
| 6,566,024 B1 | 5/2003 | Bourdelais et al. |

(Continued)

FOREIGN PATENT DOCUMENTS

WO 2014105390 A1 7/2014

OTHER PUBLICATIONS

International Search Report or PCT/US2017/018726 dated May 5, 2017.

(Continued)

*Primary Examiner* — Rafael A Ortiz
(74) *Attorney, Agent, or Firm* — Lucas & Mercanti, LLP

(57) ABSTRACT

Method and apparatus for creating highly articulated lenses and lens arrays from the combined effect of a clear-sided container of clear liquid whose sides are of uniform, conventional thickness, and may therefore be manufactured with conventional methods at conventional prices. The container's sides are shaped into the form of the surface of a lens or lens array, and in combination with the clear fluid within, whose index of refraction is close to that of the container wall, performs the function normally performed by a single lens of glass or plastic and focuses light on a plane within, or outside of said container. Such a container can be used both as an enhanced labeling display for clear fluid containers such as water, soda, liquors, liquid soap and many other liquid products, as well for as a display device only, enabling otherwise impractically thick and expensive lenses.

33 Claims, 2 Drawing Sheets

(56) References Cited

U.S. PATENT DOCUMENTS

| | | | |
|---|---|---|---|
| 7,057,823 B1 | 6/2006 | Raymond | |
| 7,304,802 B2 | 12/2007 | Raymond | |
| 8,684,223 B1 | 4/2014 | Kalamaras | |
| 2004/0170725 A1* | 9/2004 | Begleiter | A23G 3/0097 426/87 |
| 2007/0253069 A1* | 11/2007 | Saville, Jr. | B65D 3/06 359/619 |
| 2011/0261464 A1* | 10/2011 | Hoffman | G02B 3/005 359/619 |
| 2015/0286062 A1* | 10/2015 | Zheng | G02B 3/005 349/57 |

OTHER PUBLICATIONS

International Preliminary Report on Patentability for PCT/US2017/018726 dated Aug. 21, 2018.

* cited by examiner

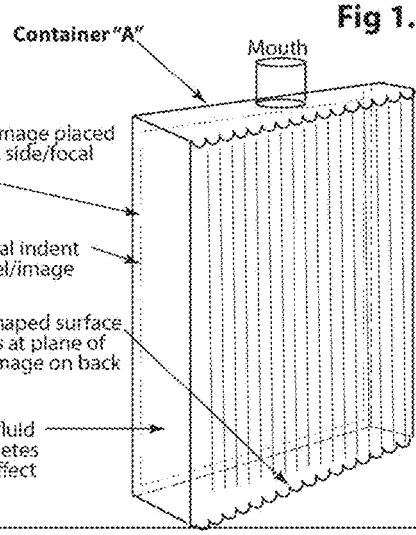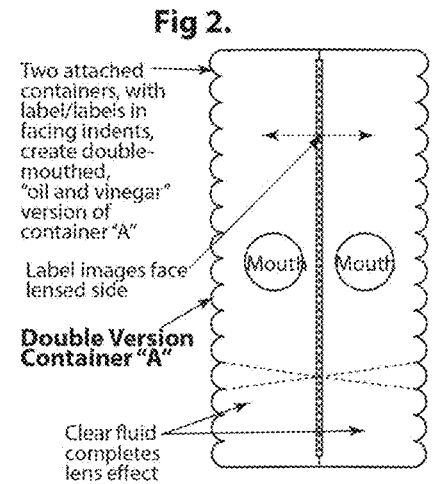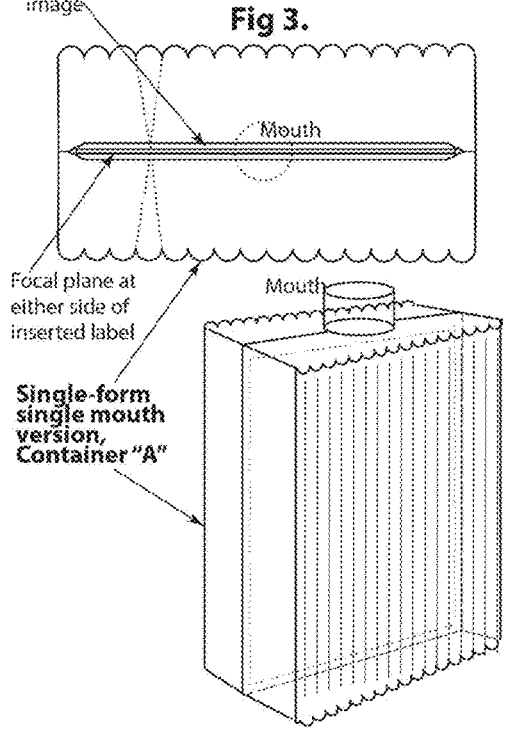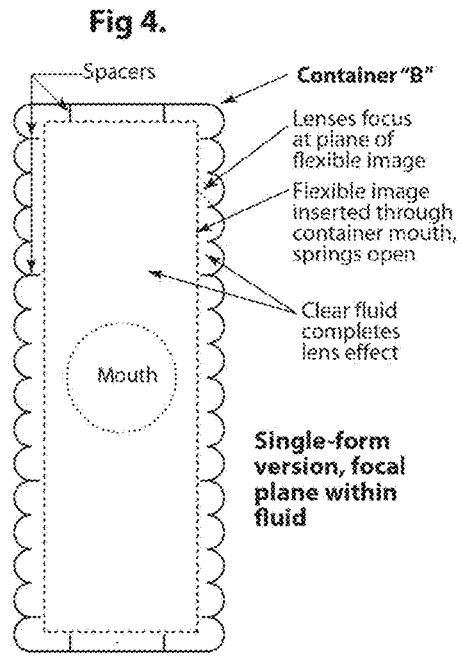

CONVENTIONALLY PRICED LIQUID CONTAINER WITH UNIQUE OPTICAL PROPERTIES

CROSS REFERENCE TO RELATED APPLICATIONS

This application is a non-provisional of provisional application Ser. No. 62/297,404 filed Feb. 19, 2016, which is incorporated by reference herein.

TECHNICAL FIELD OF THE INVENTION

The present invention relates to liquid containers having lenticular labels, and more particularly to containers having a lens or lens array formed in the sidewall of a container.

BACKGROUND OF THE INVENTION

Using lenticular effects is well known in the packaging industry, as are lenticular labels for fluid containers. The drawback to lenticular labels is the relative higher cost versus that of more conventional printing, and because the label must be thin, so do the lenses, necessitating a high lens count per inch, thus reducing the number of images which may be displayed and increasing problems for quality control.

Other lensing effects are known, such as in some liquor bottles, in order to be noticed behind a bar, the natural magnification of a curved bottle shows an inward facing image on a label on the opposite side. Many plastic water bottles have irregular surfaces so that the water within exhibits random lensing effects.

U.S. Pat. No. 5,494,445 to Sekiguchi et al discusses using a container assembly comprising an empty bottle with superimposed (combined) butterfly images on the back side wall and a grid on the opposite front side wall, having a printed transparent label as the grid, and another printed label on the back wall. However, this "grid" method suffers from the light loss inherent in such a "barrier strip" method.

U.S. Pat. No. 7,057,823B1 to Raymond discusses locating an image on one side of a container, which is imaged by, instead of a barrier strip, lenses molded into the opposite side. However, this requires extra glass or plastic to be used. For proper strength in a glass container, the thickness of the container, commonly on the order of 3/16" or more, must be at least as thick as the narrowest portion of the lenses, and the lenses, if covering a substantial portion of one side, add to the volume of material. Or, if the lenses are to be recessed to the same curved plane as the outside of the bottle, this requirement makes the whole bottle thicker. In plastic containers, which can be on the order of 5 or 6 thousandths of an inch, lenses would also require a substantial increase in the amount of plastic that is normally used, and would present fabrication problems in a blow-molded or injection-molded container, which require a uniform wall thickness.

There are disadvantages to both Sekiguchi's and Raymond's designs and methods. In Sekiguchi's method, the image is inferior to lenses, and in Raymond's technique, the manufacturing cost is higher than normal.

SUMMARY OF THE INVENTION

The present invention provides an optimally clear and bright display, by means of shaping the container sides in the form of the surface of lenses or lens arrays, with a uniform thickness to the plastic or glass, which act in conjunction with the contained clear fluid to complete the lens effect. The manufacturing cost is no higher than that of an ordinary container and label allowing injection, blow molding, or other methods and does not require printing in register on lenticular, fly's eye, or other types of lenses. The shape of the contour of the surfaces of lenses or lens arrays is substantially more articulated than those of a rounded or curved bottle or container.

A first embodiment is a clear-sided container with at least two parallel sides, one of which is shaped as the surface of a lens or lens array, and whose focal plane lies at the back of an opposing, smooth, planar side. The opposing side may optionally have with a slightly indented area, to which is adhered a label, whose inner-facing side is printed with an image corresponding to the lens or lens array. Two such containers can be attached, planar sides together, to create a dual-display container, displaying images through both of its outer sides, and the combined indented areas may be made accessible from the bottom or side, allowing a double-sided image to be inserted, rather than first affixing a label to each container.

Such a dual-display container may also be formed as a single container, rather than putting two containers together, and made such that the clear fluid fills both halves, thus requiring only one mouth. In either the doubly, or singly formed, dual-display container, the indented section may have flat sides, or sides shaped in lens contours. If lens shaped, the indented section may be slightly enlarged, and the lenses have a focal plane at that of the inserted image, with the outer container sides being flat for viewing. If the hollow section's sides are flat, the outer sides of the container are formed as lens shapes whose focal length is at the plane of the inserted image.

In another embodiment the image is printed on a thin, flexible sheet, which is inserted through the mouth of the container, and with the aid of spacers formed into either the image sheet or the container or itself, springs open to position itself parallel to, and at the focal plane of, the lenses created by the sides. The container and image may be plastic or any suitable material. The fluid may be tinted, carbonated, or viscous, so long as it is clear enough to exhibit optical properties necessary.

An additional embodiment relates to lenticular or other lens array displays rather than to conventional, practical containers. A flat or curved, substantially planar container, exhibiting the same properties as the above-described containers, may be made for image display only, with optionally much larger lenses than are normally used in lens arrays. In any case, cost would be substantially reduced both in the amount of plastic used, and shipping weight as well, since the lens may be shipped empty, and the clear liquid such as water may be filled on site. Such a display container would be especially economical in the case of very large, or very long focal length lenses, which would normally require more plastic because of their thickness, or lamination to a thick spacer. Such a liquid-filled display lens also allows insertion of a thin image disposed at the focal plane of the lenses, which by means of attached flotation devices, would be virtually weightless and easily moved by means of an attached ferrous metal piece, activated by an external magnet on a motor shaft or otherwise moved, creating a dramatic change in the image with no motion necessary on the part of the viewer. Additionally, a "cartesian diver" method of moving the image up and down by means of applying a slight pressure to the container and thereby changing the buoyancy of the floating image could create a novel toy or display. Such a liquid-filled lens would also be useful for outdoor displays, where sunlight would ordinarily heat the image, but whose heat would be dramatically reduced by the contained liquid.

Many different container shapes and configurations are possible including round, rectangular, oval, polygonal, and non-symmetric shapes as well, as long as the lens-shaped sides of the clear containers work in concert with the clear fluid contained to create the lens effect, beyond the natural effect produced by a rounded or curved bottle or container. Once used, the containers may be refilled with water or any clear liquid to display their images.

BRIEF DESCRIPTION OF THE DRAWINGS

FIG. 1 is a perspective view of an embodiment according to the invention;

FIG. 2 is a top view of an embodiment having double containers attached back to back, with each container having its own mouth and discrete interior region;

FIG. 3 is a top view of an embodiment also having double containers, but wherein the containers are joined internally and having a single mouth, and a perspective view of the same container;

FIG. 4 is another embodiment which has images spaced from the lens walls; and

DETAILED DESCRIPTION OF THE PREFERRED EMBODIMENTS

Figure 5:
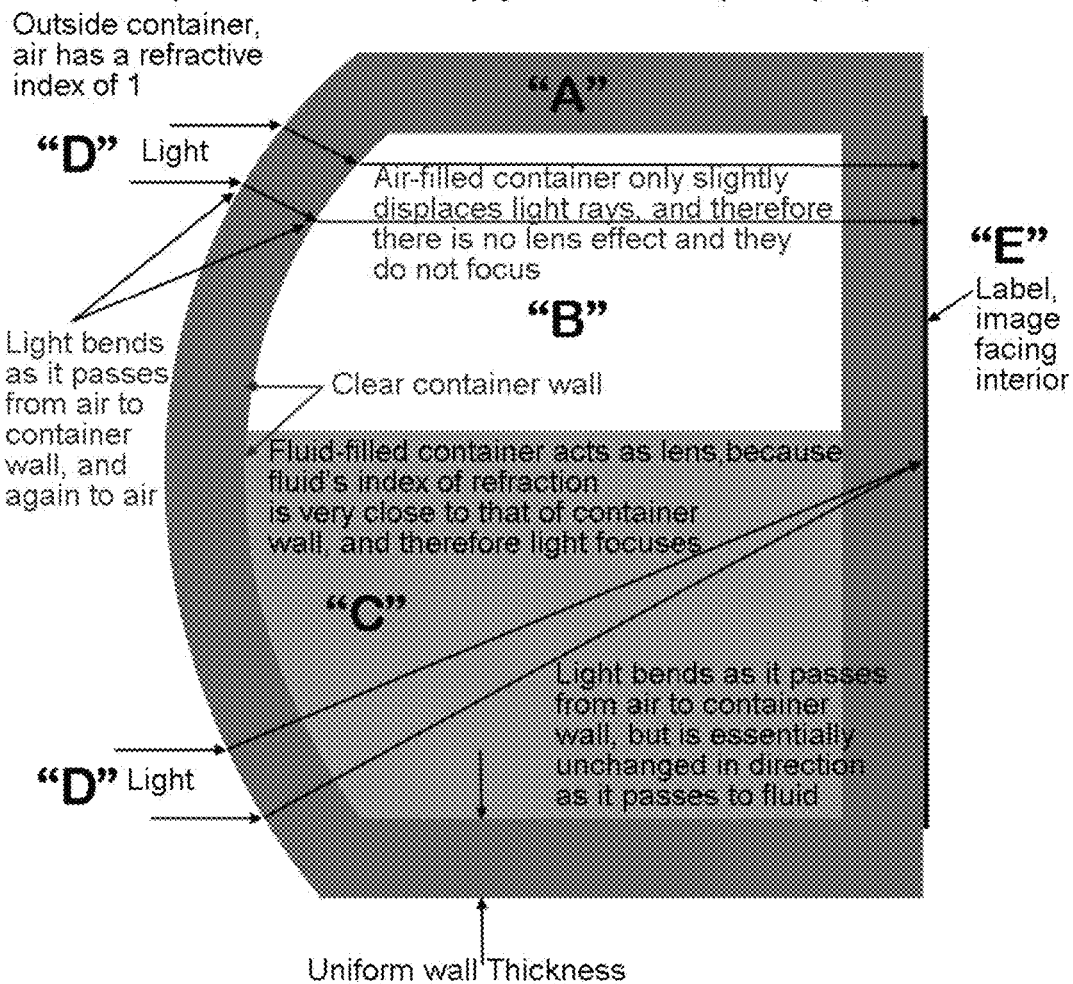
FIG. 5 shows a schematic approximation of a single lens in a lens array, and the path taken by light rays when the container is filled with a clear liquid whose index of refraction is substantially the same as the container walls, compared to the path taken by light rays which travel through an empty container.

Several embodiments of the invention will be described, but the invention is not limited to these embodiments.

FIG. 1 shows a perspective view of a substantially rectangular container "A", whose front, or first side is formed in the shape of the surface of a lens array, which, acting in combination with the clear fluid inside of it which completes its lens effect, has a focal plane at the outside surface of its rear, opposed or second side, at which plane is affixed a label with a corresponding image.

FIG. 2 shows a double-container, made from two, attached containers, whose labels just fit in the combined, indented space between them, at the focal planes of the outer sides, which double container can hold two distinct liquids, such as oil and vinegar or shampoo and conditioner, wherein each of the two containers are accessible only from its own container mouth. The indented spaces may be made in such a way as to allow either affixed labels, or a double-sided label, inserted after assembly.

FIG. 3 shows a single-formed version of the two attached containers, wherein the interior spaces of the two containers are joined and having a single mouth with a single, double-sided label inserted as in the double container of FIG. 2.

FIG. 4 shows a container whose lensed sides focus within the container at the plane of an inserted image, printed on a flexible substrate, which is rolled or otherwise compressed, so as to be able to be inserted through the container mouth, and subsequently springs open, disposing itself at the focal plane of the lensed sides, by means of spacers formed into the flexible image or the container.

FIG. 5. shows an enlarged view of a single lens element within an array, and the paths taken by light rays in a fluid-filled versus an empty container. The container wall "A" is of a uniform thickness, which, in a plastic bottle may be as thin as about 0.005". If the container, as shown in area "B", is empty, the light rays, "D" will pass through the wall with little deviation to their direction, since the change in refractive index of 1 from the outer air, to very approximately 1.5 of the glass or plastic (somewhat higher for PET plastic, commonly used in plastic bottles) is reversed when the rays pass from the wall back to air inside the container. The result is that the rays do not focus.

However, when the container is filled with a substantially index-matching liquid, as shown in area "C", the thin, curved surface of the container wall acts in conjunction with the contained fluid as a single lens, much like a "doublet" lens made of two types of glass, and the light rays focus as determined by the radius of curvature of the container surface. The container's label "E" on the side opposite the lens array, and whose image corresponds to the lens array and faces inward, lies at the array's focal plane. For the sake of the illustration the light rays are shown traveling into the container, but of course travel in both directions and an observer on the array-side of the container will see label's inner image as an optical display showing three-dimensionality, motion, or any of those properties commonly associated with such lens arrays.

Although several embodiments have been described, the present invention is not limited to these embodiments, and other variations and modifications can be made as will occur to those in the art. The scope of the invention is defined only by way of the following claims.

What is claimed is:

1. A container for containing a substantially transparent, or clear liquid, the container having a width, with clear first and second side walls having a thickness less than the width of the container, the second side wall having an interior and an exterior surface being shaped in a contour of curved surfaces of lenses and/or lens arrays on both the exterior and interior surface of the second wall, the exterior surface having a convex lens shape and the interior surface having a concave lens shape corresponding to the convex lens shape, the lens shapes being substantially more articulated than those of a rounded or curved bottle or container, such that if the container is filled with clear liquid located between the side walls, the clear liquid would contact the interior surface of the second wall having the concave lens shape, and light rays passing through the second side wall would become focused on a focal plane located substantially in the first side wall when viewed outside the container through the second side wall and the liquid would complete the lens effect, to focus light rays on an image at the focal plane, compared to light rays which would pass through the second side wall, and not be focused on the first side wall, if the container is empty.

2. The container according to claim 1, in which at least one outer side of the container is shaped as a lens, or lens array whose focal plane is at the outer side of its opposite, smooth, planar side, where a label, bearing an image on its inner side, is affixed.

3. The container, according to claim 2, in which sides of two containers are affixed together to form a dual container.

4. The container according to claim 3, in which the sides are indented and contain a label, such that the label's outer side is on the same plane as the rest of the outer side of the container to facilitate affixing, and which container can hold two separate types of clear liquid, accessible through two separate container mouths.

5. The container according to claim 3, in which indented portions are extended to reach one side to the container to define a cavity, such that a label with an image on both sides may be inserted into the cavity.

6. The container according to claim 5 in which the walls of the indented areas are lens-shaped so as to focus on the plane of the inserted label, and whose opposite, outer sides are a smooth plane.

7. The container according to claim 3, in which the dual container is molded in a single piece such that the fluid fills both halves and the container has only one mouth.

8. The container according to claim 1, in which the outer sides of the container are shaped in the contour of the surfaces of lenses or lens arrays, whose lens effect is completed by the clear fluid contained within, and whose focal plane lies within the volume of the fluid.

9. The container according to claim 8, in which an inserted image is printed with inks not soluble in the contained clear liquid, on a thin, flexible substrate, which, when inserted through the mouth of the container, springs open outwardly into a shape which becomes disposed at the focal plane of the lens-shaped sides, with the help of spacers formed into itself or the container sides.

10. The container according to claim 1, in which a flat or curved, substantially planar, liquid-filled container functions primarily as a display lens or lens array, rather than as an ordinary practical fluid container, wherein the container is thinner compared to its width and height.

11. The container according to claim 1, in which the focal plane lies at an outer surface of an opposite, smooth, planar side.

12. The container according to claim 1, in which the focal plane lies within the container.

13. The container according to claim 12, in which an image is inserted into the clear fluid at the focal plane of the lensed side, which image is provided with floatation devices, such that it can be moved.

14. The container according to claim 13, in which the image can be moved by at least one of magnetic or variable buoyancy means.

15. A container for containing a substantially transparent, or clear liquid, comprising a first clear side wall and second clear side wall, the second side wall having an interior and an exterior surface being shaped in a contour of the surfaces of lenses and/or lens arrays on both the exterior and interior surface of the second wall, the exterior surface having a convex lens shape and the interior surface having a concave lens shape corresponding to the convex lens shape, the lens shapes being substantially more articulated than those of a rounded or curved bottle or container, such that if the container is filled with clear liquid located between the side walls, the clear liquid would contact the interior surface of the second wall having the concave lens shape, and light rays passing through the second side wall would become focused on a focal plane located substantially in the first side wall when viewed outside the container through the second side wall and the liquid of the lenses and/or lens arrays and would complete the lens effect, to focus light rays on an image at the focal plane, compared to light rays which would pass through the second side wall and not be focused on the first side wall if the container is empty and wherein the container defines a label location region for holding a label with the image at the focal plane.

16. The container according to claim 15, wherein the focal plane is located at a second side opposite from the first side, wherein the label location region is located on the second side.

17. The container, according to claim 15, comprising two containers affixed together.

18. The container according to claim 17, wherein the two containers define discrete internal liquid containing regions which are not in liquid communication, and wherein the container has two mouths.

19. The container according to claim 17, wherein the two containers define two internal fluid containing regions which are in fluid communication and wherein the container has one mouth.

20. The container according to claim 17, wherein the label location region is located between the two containers.

21. The container according to claim 20, wherein the label locator region holds a label having images on both sides.

22. The container according to claim 15, wherein the label location region is located within the container, spread from the first clear side.

23. The container according to claim 15, wherein the label location region is defined by an indented area within the container.

24. The container according to claim 22, wherein the label contains an image printed with insoluble inks and wherein the label is a thin flexible substrate which is adapted to be inserted through mouth of the container.

25. The container according to claim 24, wherein the substrate is folded to be inserted through the container mouth, becomes unfolded after insertion to be essentially planar and dispersed at the focal plane.

26. The container according to claim 25, wherein the container has spaces which locate the substrate at the focal plane.

27. The container according to claim 15, wherein the lenses with contained fluid define a focal plane within the container.

28. The container according to claim 15, wherein the distance between the first side and second side is substantially less than the width and height of the container.

29. The container according to claim 15, wherein the label location region is accessed from outside the container, to enable insertion of a label after the container is formed.

30. The container according to claim 15, wherein the lenses with contained fluid define a focal plane at the outer surface of the second side.

31. The container according to claim 15, wherein the label location region is located within the container, and including a label, which floats within the container.

32. The container according to claim 31, wherein the label has a magnetic property to enable movement of the label by an exterior magnet.

33. The container according to claim 31, including a device to control the position of the label within the label location region.

* * * * *